United States Patent [19]
Luger

[11] 3,875,410
[45] Apr. 1, 1975

[54] RADIATION DETECTOR USING A DIGITAL ELECTROMETER SCALER

[75] Inventor: Paul P. Luger, Seattle, Wash.

[73] Assignee: The Pioneer Educational Society, Portland, Oreg.

[22] Filed: Apr. 28, 1970

[21] Appl. No.: 32,578

[52] U.S. Cl. .............................. 250/374, 250/376
[51] Int. Cl. ...................... G01t 1/14, G01t 1/18
[58] Field of Search ........ 250/83.3 PD, 83.6 R, 374, 250/376

[56] References Cited
UNITED STATES PATENTS

| | | | |
|---|---|---|---|
| 2,794,955 | 6/1957 | Rich | 250/83.3 PD X |
| 2,802,112 | 8/1957 | Schwede | 250/83.6 R X |
| 2,986,697 | 5/1961 | Luger | 250/231 R X |
| 3,082,328 | 3/1963 | Möhring | 250/83.6 R X |

*Primary Examiner*—Archie R. Borchelt

[57] ABSTRACT

A digital system is described for automatically operating an electrometer. A binant electrometer is employed with a quartz fiber mounted at one end but free to vibrate at the other in an AC field. The fiber oscillates if a charge is placed upon it. An optical slit replaces the ordinary eyepiece reticule scale. With the quartz fiber adjusted so its image is in focus at the optical slit, photoelectric signals are obtained at null charge on the fiber. The quartz fiber is repeatedly charged and allowed to discharge by collecting ions from a source under measurement. Each photoelectric signal causes a digital time reading to be taken. The time readings are used to evaluate the current due to the collected charge. The photoelectric signals, by feedback, also operate the electrometer for continuous or intermittent-continuous operation. Basically the system is a current digitizer. Analog recording with this single slit real image system is also described. Application is explicitly made to reactor monitoring and control; other types of production control are indicated. The method is applied to the measuremment of force in other types of fields.

8 Claims, 16 Drawing Figures

INVENTOR.
Paul P. Luger
BY
TW Secrest

INVENTOR.
BY Paul P. Luger
TW Secrest

RADIATION DETECTOR USING A DIGITAL ELECTROMETER SCALER

This invention relates to deflection instruments and their use for the measurement of various kinds of forces; in particular it relates to an improved method and means for the continuous monitoring and recording of the phenomena measured by such instruments.

In certain respects this application, in seed, is similar to my former publication, U.S. Pat. No. 2,986,697. However, it contains substantial improvements and innovations beyond those described in the earlier patent.

In many deflection instruments, the forces deflecting the movable element are subject to a field of force of one kind or another; where the relationship between the field and the forces or between the forces themselves are known, measurements may be undertaken. For example, when an electrostatic field of force controls the movement of a member that is collecting an electric charge, an electric current may be measured. Known physical laws relate the current and the rate of deflection of the movable element in such instruments.

More in particular, it is often desirable to use a quartz fiber electrometer in conjunction with an ionization chamber for radiation measurements. A well-designed electrometer is sufficiently accurate to be employed as a secondary standard but requires operator observation of the rate of deflection of the electrometer needle. The need for continuous operator attention has inhibited use of an electrometer for routine measurements despite many desirable characteristics.

It is therefore the primary object of this invention to provide an improved method for the automatic monitoring of the phenomena measured by these deflection instruments.

It is another object of this invention to provide a measuring device in which continuous sensitivity monitoring is not required. Hence the special apparatus for sensitivity measurements described in the earlier patent publication is no longer necessary when the novelties of this new invention are employed.

It is a further object of this invention to provide an instrument that may be used as an analog to digital converter.

These and other objects of the invention are practiced, generally speaking, by providing a deflection instrument having a movable element in a field of force. If the field is electric the forces will be produced by electric charges of opposite sign, supplied to the moving element. Also associated with this instrument is a source of illumination and an optical system adjusted to focus the real image of the deflection element (usually provided in the form of a needle clamped at one end and free to vibrate at the other) upon an optical mask having one slit thereon. A photoelectric cell is either mounted behind the slit or is connected to the slit by means of fiber optics so that signals may be generated when the deflection element is in a null condition. The signals generated through the instrumentality of the real-image-optical-slit-photocell arrangement are then employed both to operate a feedback control for the instrument itself, as well as to control digital time counters and recorders, thus to store in memory digital information of the rate of change of the potential of the needle due to the charge accumulating thereon.

In employing such a unit of invention in connection with an ion chamber and a quartz fiber needle electrometer for the measurement of radiation, the "rate of charge" or "drift" method is employed and currents of less than about $10^{-16}$ ampere may be measured.

In the device first to be described, time is the dependent variable and is the principal quantity under measurement. Independent variables, such as voltage, may be set by control nobs or are variables to be measured, as is the electric current with quartz fiber electrometers. Constants are either built into the device or are set by controls. As a result, all measurements appear as digital, time-interval readings. This makes it natural for automatic readout as on a tape or card together with visual display of the reading if desired.

The arrangement thus generally described provides for fully automatic operation of the scaler or digitizer eliminating the necessity for attendance by a trained operator. As a digitizer the instrument makes possible the change of information from analog to digital form. Another important object of this invention is to describe an automatic method of taking current measurements with an electrometer on a continuous basis.

This is possible since the time required for sensitivity measurements is completely eliminated and the dead time between measurements may be a minimum, constant time interval, (less than a second). Thus all measurements can be made in real time. This is important if periods or half lives are to be determined.

A further object of this invention is to apply this digitizing, flux-measuring equipment to the control of a nuclear reactor. Not only does such a digitizer afford a means of obtaining reactor flux levels at several places simultaneously in the core lattice, and at frequent, almost continuous intervals, but these readings may be further applied to the automatic control of the reactor's power output.

It is also the object of this invention to employ rotating arm or deflecting arm instruments as optical, analog-to-digital converters. In these instruments the real image of the deflecting arm may be used to derive time interval measurements in an optical slit-phototransducer system; or the moving arm itself may cause the interruption of optical flux incident upon the optical slit-phototransducer arrangement. Such devices may be used as rate of production indicators.

The following description and accompanying drawings will more fully describe the purpose of this invention:

Figure 3:
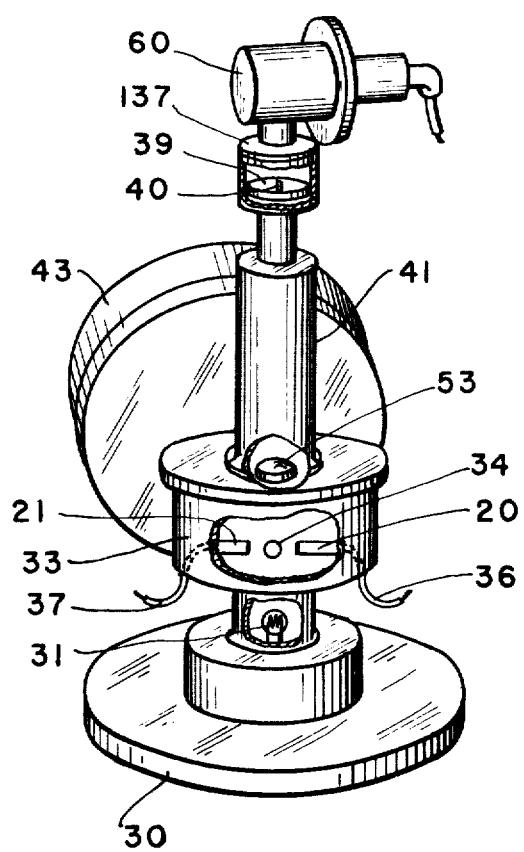

FIG. 3 indicates the general arrangement of one form of apparatus embodying the invention.

Figure 4:
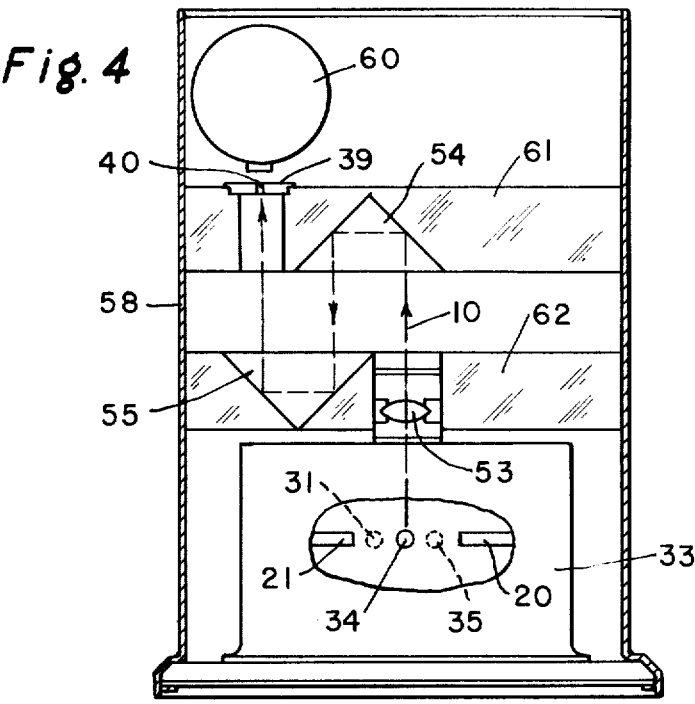

FIG. 4 illustrates the optics associated with the electrometer in an embodiment of the invention.

Figure 5:
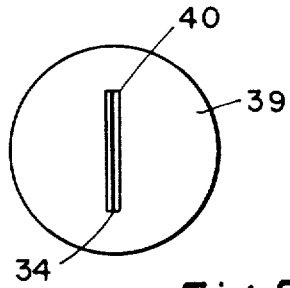

FIG. 5 illustrates an optical slit with the needle in a nulled, i.e., equilibrium position.

Figure 5A:
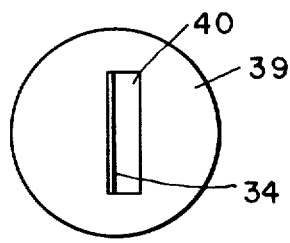

FIG. 5A illustrates a mechanical, adjustable optical slit, opened for adjustment purposes.

Figure 5B:
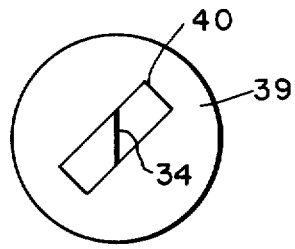

FIG. 5B illustrates the same optical slit shown in FIG. 5A but rotated so as to further facilitate adjustment.

Figure 6:
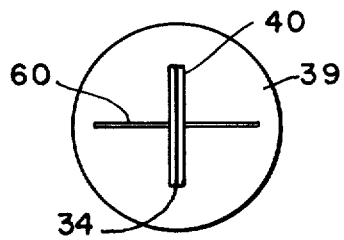

FIG. 6 shows a fixed optical slit together with an auxiliary slit useful for making optical alignment adjustments.

Figure 7:
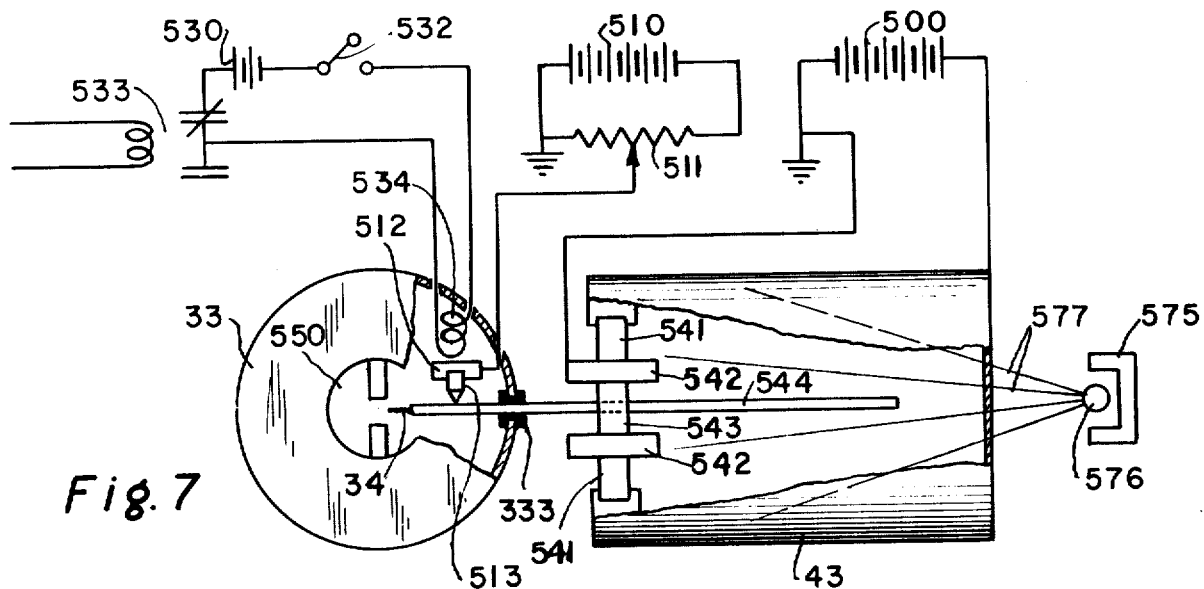

FIG. 7 illustrates an arrangement of electrical circuits useful in the practice of the invention.

Figure 8:
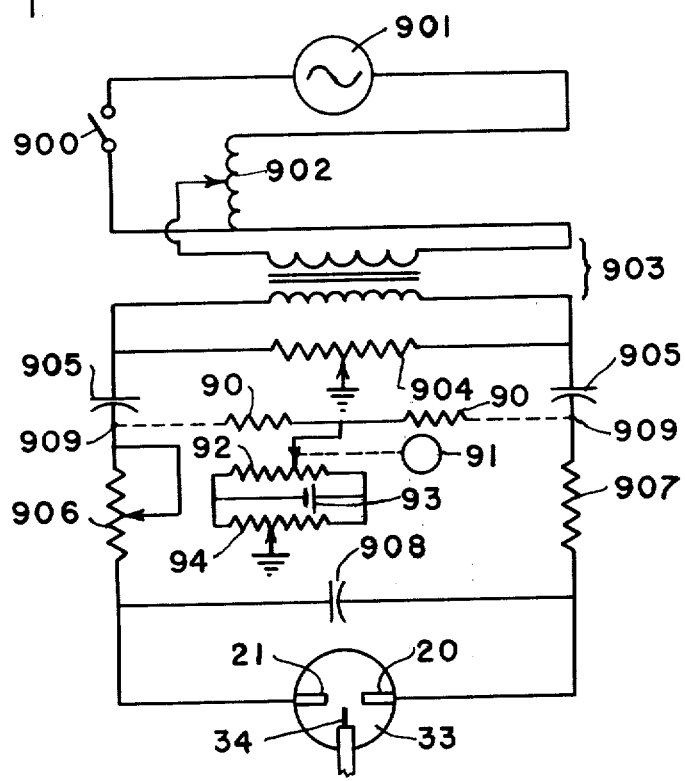

FIG. 8 shows a schematic circuit diagram for the AC potential supply for the vibrating fiber electrometer.

Figure 9:
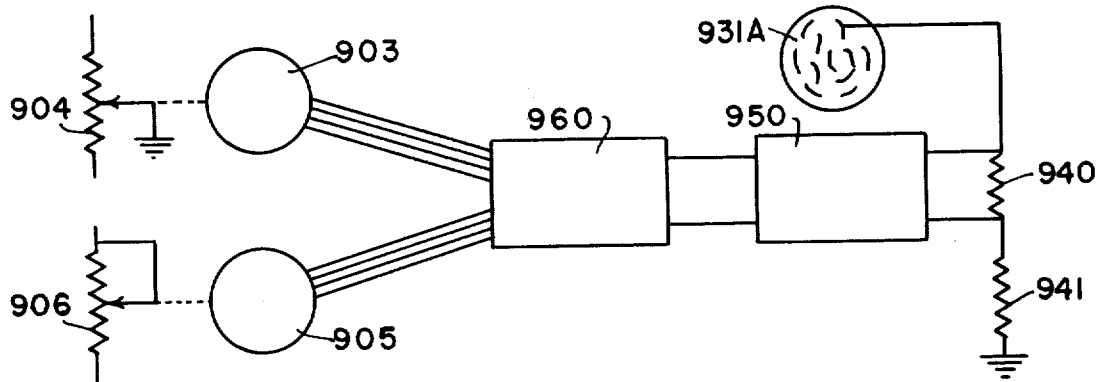

FIG. 9 shows one method for making automatic adjustment of potentiometers for AC null control.

Figure 10:
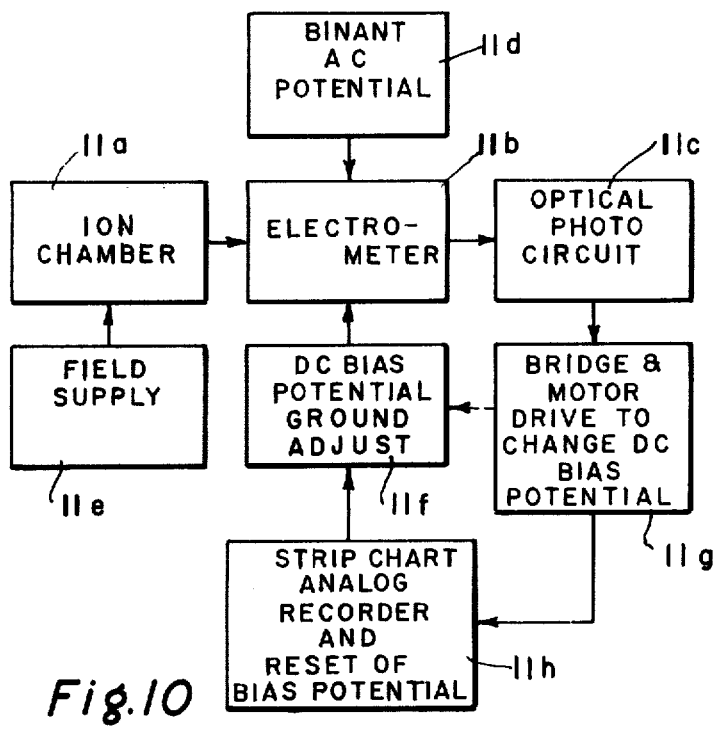

FIG. 10 is a block diagram illustrating a system of monitoring the AC electrometer for analog recording.

Figure 11:
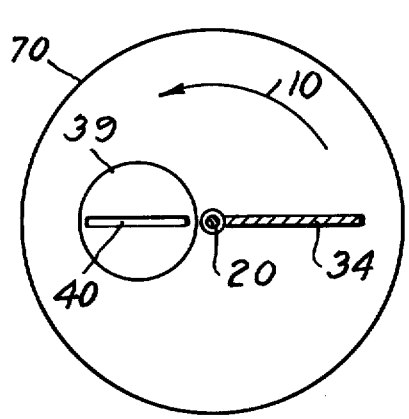

FIG. 11 is a device for changing analog to digital information and may be used as a rate of production indicator.

Figure 12:
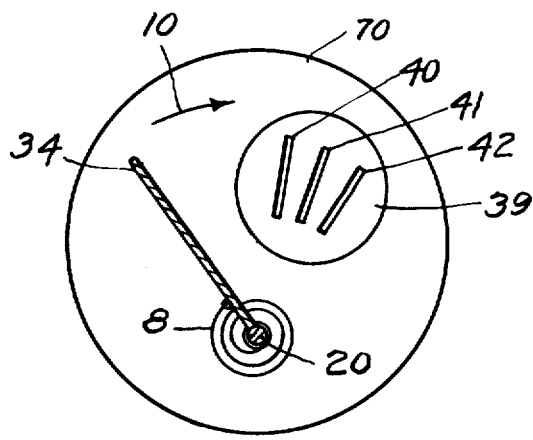

FIG. 12 is another optical signal device capable of use as a rate of production indicator.

Figure 13:
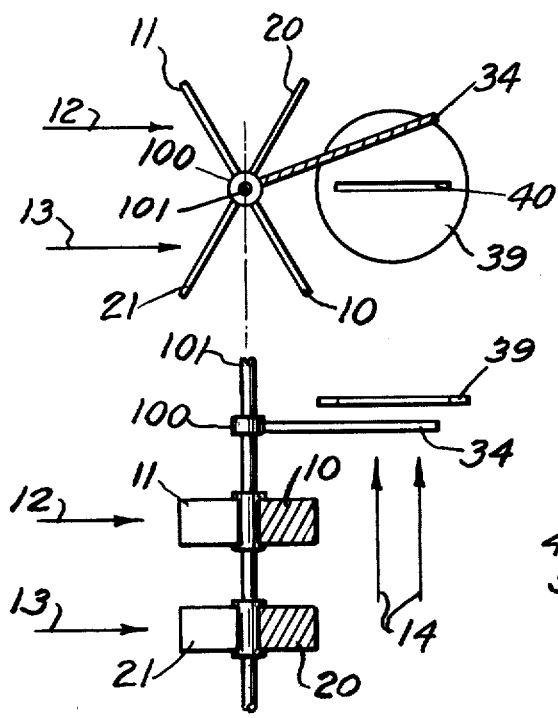

FIG. 13 is a radiometer application of the invention showing top and side view of a rotating system.

Figure 14:
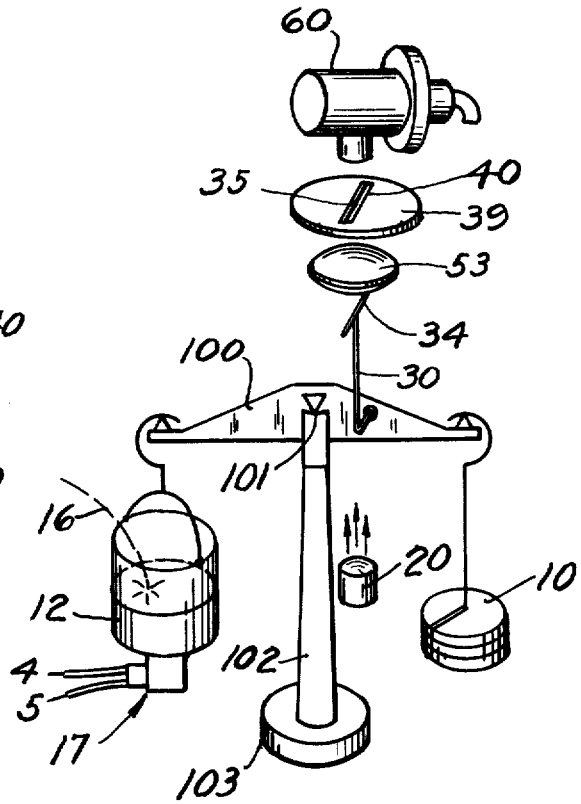

FIG. 14 is a gravitational field application of the invention for the measurement of force.

Figure 1:
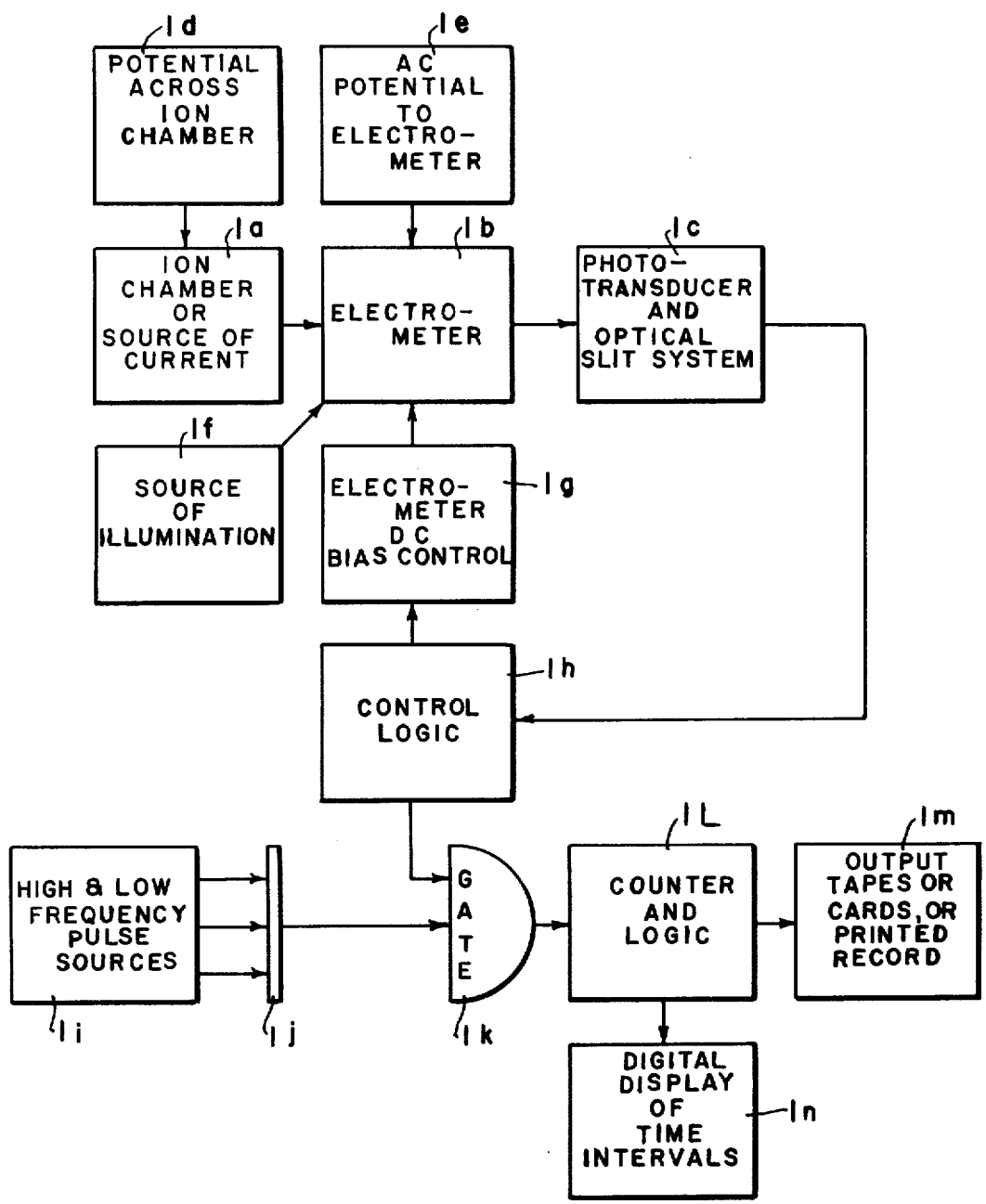
FIG. 1 shows a block diagram of a precision radiation measuring device.

Referring now to the block diagram of FIG. 1, a general purpose precision radiation measuring system is shown. It is comprised of the following:

1. an ion chamber, indicated at $1a$,
2. an electrometer indicated at $1b$,
3. a phototransducer and optical slit system, indicated at $1c$,
4. a DC potential for the ion chamber, indicated at $1d$,
5. an AC potential for the electrometer, indicated at $1e$,
6. a source of illumination for the optical system, indicated at $1f$,
7. a DC bias potential and bias control for the electrometer, indicated at $1g$,
8. a control unit containing logic to control the electrometer as well as the the systems time interval measuring units, indicated at $1h$,
9. high and low frequency pulse sources, indicated at $1i$,
10. an OR gate to pass one of the selectable frequencies, indicated at $1j$,
11. an AND gate for passing pulses to the counter during the time interval which is to be measured, indicated at $1k$,
12. the primary counter and associated logic, indicated at $1l$,
13. output instrument or instruments for recording the time intervals, indicated at $1m$,
14. a visual display of each time interval reading may also be employed, indicated at $1n$.

Figure 2:
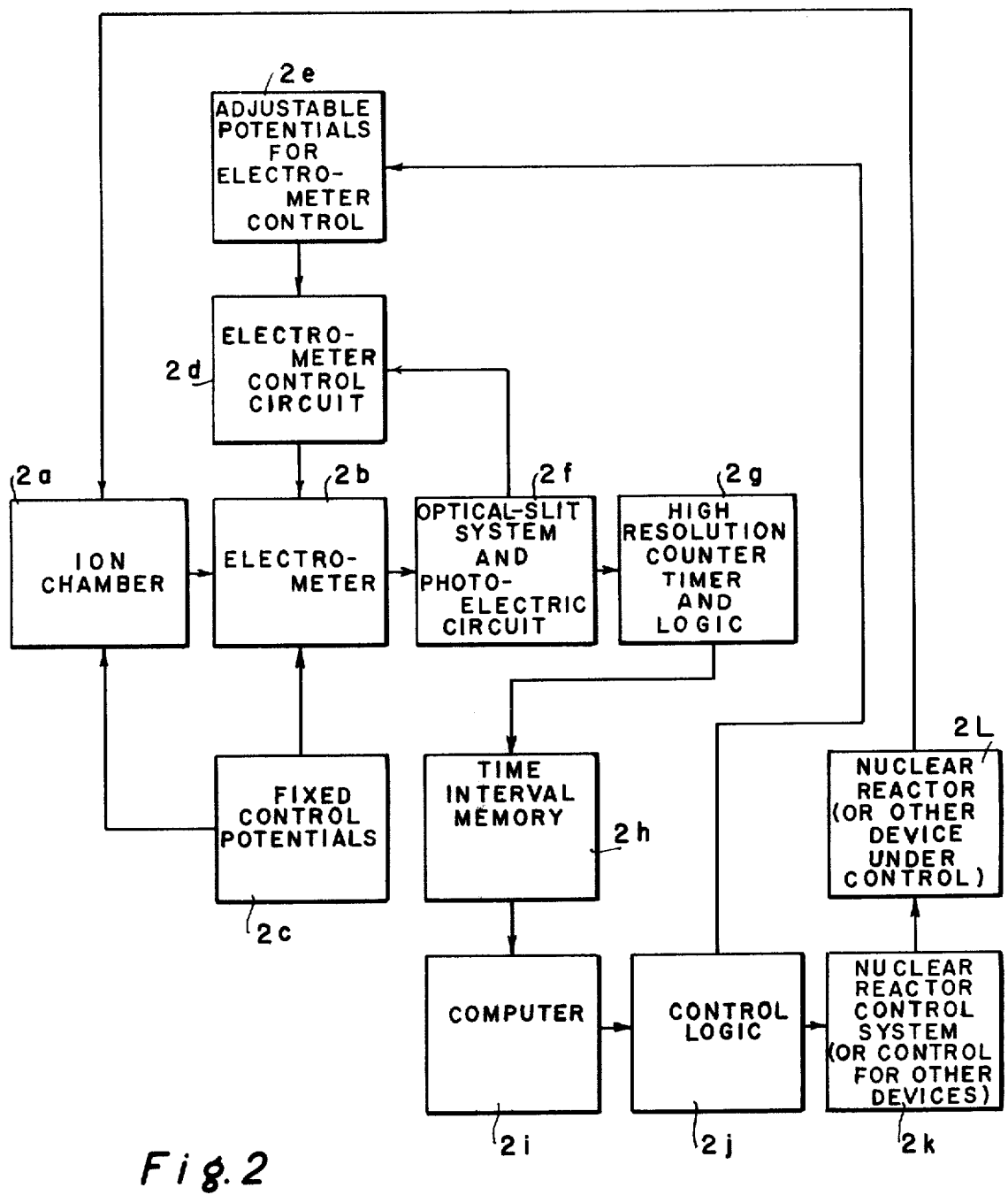
FIG. 2 is a block diagram illustrating the basic components of a system suitable both for nuclear reactor flux level measurement and power output control.

In FIG. 2 the digital electrometer scaler, adapted for use as a control system, is seen to comprise the following:

1. an ion chamber, indicated at $2a$,
2. an electrometer, indicated at $2b$,
3. a source of fixed potentials for control of the electrometer and ion chamber, indicated at $2c$,
4. an electrometer control circuit, indicated at $2d$,
5. the adjustable bias potentials for electrometer control, indicated at $2e$,
6. an optical-slit system and a phototransducer assembly, indicated at $2f$,
7. a high resolution counter-timer, and logic at $2g$. The logic performs those functions previously described for FIG. 1 at $1h$, $1i$, $1j$, $1k$, and $1L$.
8. a time interval memory, indicated at $2h$,
9. a computer unit, indicated at $2i$,
10. control logic responsive to the photoelectric signals for control of electrometer potentials as well as the control of a nuclear reactor or other device, indicated at $2j$.
11. a control system, which may be a set of control rods, a water dumping system or a scram control--in the case of a nuclear reactor; or more generally, a control device for other systems, indicated at $2k$.
12. a nuclear reactor or other device under control, indicated at $2L$.

Each of these components will be considered in more detail after a description of the electrometer itself.

The Shonka electrometer has recently appeared on the commercial market bearing the name of its designer. It is a highly sensitive quartz fiber instrument of rugged design and as such is desirable for reactor control applications. In conjunction with the novelties of this invention, it may also serve as a general purpose, high precision radiation measuring instrument. The heart of this binant electrometer employs a conducting quartz fiber which is clamped at one end but free to vibrate on the other. The free end is mounted so it may vibrate in an alternating electric field maintained between two fixed electrodes or binants. The quartz fiber needle will vibrate in the AC field if either of two conditions is met:

1. the fiber bears an impressed DC potential, or if
2. there is more AC potential on one binant than the other.

But if neither of these conditions obtain, the quartz fiber or needle will be at rest, in both AC and DC equilibrium in the AC field. It may be noted that a DC bias potential is sometimes applied, not directly to the fiber as in 1 above, but is superimposed upon the AC potential applied to the binants. This has the effect of producing more potential on one of the binants than the other. Either of these two biasing methods may be used in the automatic operation of the electrometer.

Under automatic operation, the eyepiece reticule, against which one ordinarily observes the quartz fiber either at rest or fanned out in vibration, is replaced with a single optical slit, and if suitable control is employed, the Shonka electrometer may be operated on a fully automatic basis. The single slit may be so adjusted that the real image of the electrometer needle is focused on the slit when the needle is at rest in the AC field.

Although the Shonka electrometer is supplied for commercial use with a reflecting mirro-optical system, it has been found that a refracting lens system gives more positive operation with this photoelectric-opticalslit method of readout which is to be described. It may be noted that either mirror or lens system may be employed with this invention.

With a single-slit optical system, used in conjunction with the Shonka alternating current field electrometer, control circuitry becomes simplified since every reading with the instrument, after the initial reading, is a radiation measurement. This contrasts favorably with respect to the older, double-slit, aforementioned patent application, which double slit system requires circuitry for distinguishing four types of measurements.

The structure shown in FIGS. 3 and 4 show two of various arrangements of ion chamber, electrometer, photomultiplier and optical system. Electric charge from the ion chamber 43 (FIG. 3 only) to the electrometer quartz fiber needle, the end view of which is shown at 34, causes the needle, which initially oscillates between positions 35 and 31 (FIG. 4 only), to come to an equilibrium or rest position. The charge-biased needle oscillates because of the AC field which is produced by applying an alternating current through wires 36 and 37 to the electrometer binant electrodes at 20 and 21.

In FIG. 3 is shown a supporting base 30 which carries a source of illumination at 31. (This source of illumination is not shown in FIG. 4.) The electrometer housing 33 permits light incident on the quartz fiber needle 34 to reach the lens 53. The lens is so adjusted that the real image of the fiber needle is focused on the optical slit 40, contained in the mask 39. The mask containing the optical slit is in the focal plane of the lens 53; a photomultiplier tube contained in the housing 60 is thereupon illuminated by light proceeding through slit 40.

In FIG. 4 the optical path is increased by employing prisms 54 and 55. The housing 58 holds the electrometer housing 33. Support 61 holds the optical slit mask 39 in related operating adjustment to the photomultiplier housing 60. Support 61 also holds prism 54. Support 62 can be seen to hold prism 55 in addition to a housing for lens 53. The optical path 10 is indicated by the dotted line.

In FIG. 3, housing 137 holds the optical slit mask 39 in the plane of focus of the real image of the needle 34. Although the diagrams show lens 53 employed to form this real image, it might have been accomplished by means of a reflecting mirror arrangement as used in the commercially available Shonka electrometer.

In FIGS. 5, 5A, and 5B is shown a mask 39 and an optical slit 40, together with a superimposed real image 34 of the electrometer needle. The optical slit may be fixed or adjustable. The slit, if fixed, is ruled on an opaque mask. The mask may be a glass reticule made opaque by coating. The coating may be a metal, such as copper and silver, sputtered onto the glass. The ruling is usually machine controlled, thus removing the coating to any desired specification of width.

FIG. 5 shows an optical slit in adjustment with the real image of the electrometer needle blocking out most of the illumination. The decrease of illumination due to the presence of the real image of the needle is sufficient to produce a photoelectric control signal.

FIG. 5A shows an adjustable, mechanical slit, desirable for the practice of this invention, in that it may be opened, as shown, to facilitate one's viewing and adjustment of the real image of the electrometer needle.

FIG. 5B shows the adjustable slit of FIG. 6 in a rotated position to further facilitate viewing the real image of the electrometer needle and for making adjustments of the optical system.

One may employ a ramsden eyepiece (not shown in the drawings) for viewing the optical slit and needle image; it is necessary, of course, to first remove the photomultiplier and the photocell housing, or the fiber optics, as the case may be, from its position above the optical slit. Then a ramsden or equivalent eyepiece is set in place above the slit and adjustments may be made.

FIG. 6 shows two fixed slits 40 and 60, arranged on mask 39. The auxiliary slit 60 is perpendicular to, but also may be at an angle with relation to the principal slit 40. The auxiliary slit is usually narrower than the principal one, since its purpose is to aid the eye to locate the image of the needle and in positioning mask 39 while making initial adjustments. The initial adjustment of mask 39 requires that when the image of the needle is at mechanical rest, that is, at AC and DC null, it should be in some degree of overlapping relationship with slit 40.

FIG. 7 shows three sources of potential and three circuits useful in operating the system. At 500, the ion chamber potential is shown. The ion chamber is comprised of the chamber itself at 43 holding a collecting electrode 544 by means of a double circular insulator 541 and 543. To a conducting ring 542, supported between the high dielectric insulators 541 and 543, is attached the grounded end of the ion chamber potential 500. The high side of this potential is placed on the outer wall of the chamber.

Ions are produced in the chamber by incident radiation, 577, from source, 576, partially surrounded by shield, 575. Low radiation level source material may be conveniently placed within the ion chamber.

A small relay with closing coil shown at 534, and moving armature at 512, fits inside the electrometer case, 33, adjacent to the binant electrometer shown at 550. This relay armature carries a small contactor, 513, adjusted to make and break contact with the collecting electrode, 544, of the ion chamber. Contactor 513 carries a potential from source 510 which is adjustable through potentiometer 511. This biasing potential is capable of setting the electrometer needle, 34, in oscillation when the needle is in an AC field.

Another potential at 530 controls relay coil 534 and is capable of removing contactor 513 and thus removing the source of bias 510 from the electrometer-ion chamber-conducting electrode comprised by 34 and 544 in connection.

It may be noted that the bias supplied by potential source 510 must be opposite to the charge collected by the ion chamber due to the impressed potential from source 500.

The mode of operation of the electrometer in conjunction with the single-slit-photoelectric arrangement will now be described.

Referring to FIG. 7, the electrometer quartz needle 34 and ion chamber collecting electrode 544 are permanently connected. Together they constitute the systems charge-holding conductor. This conductor may receive charge in two ways. Either from the ion chamber or through contactor 513 from potential source 510 which is adjusted by potential divider 511.

After contactor 513 is withdrawn from the charge-holding conductor 34-544, charge produced in the ion chamber 540 due to radiation 577 from source 576 in shield 575 is collected onto the charge-holding conductor system. On the other hand, when contactor 513 is in connection with the charge-holding conductor 34-544, the charge from the ion chamber leaks off to the ground through potential divider 511, and the charge-holding conductor system is held at a fixed bias potential determined by potential source 510 and potentiometer 511.

If we suppose that a negative charge is left on the charge-holding conductor 34-544 when relay coil 534 becomes energized, thus removing contactor 513 from 34-544, then a positive charge from ion chamber 43 collected at electrode 34-544 will cause the negative charge thereon to be neutralized, supposing that charge from the ion chamber is permitted to collect over a sufficiently long period of time.

When this balance of charge is effected needle 34, FIG. 7, will no longer oscillate in its AC field and the real image of the electrometer needle will be in focus over optical slit 40 (FIG. 3 or 4). This produces a signal in the photomultiplier circuit (1i of FIG. 1), which in turn energizes relay 533 thereby deenergizing coil 534 by the removal of potential 530. Immediately thereupon negative biasing charge is returned to the charge-collecting conductor 34-544 and needle 34 resumes its state of oscillation. In this manner the system operates continuously, first charging the conductor and needle and then permitting ions of opposite charge from the ion chamber to collect on the charge-holding conductor.

It is clearly evident then in a series of such measurements the same electric signal that energizes relay 533 may also operate a time-measuring system to indicate the time interval, $\Delta t$, required for the charge from the ion chamber to balance the known initial biasing charge that is placed on the charge-collecting conductor 34-544 from source 510. Basically, the current, i, from the ion chamber may be expressed in terms of the time interval, $\Delta t$, required for the equal and opposite potential, $\Delta V$, caused by equal and opposite charge $\Delta Q$ (described above) to balance one another. Thus $i = \Delta Q/\Delta t$ and $i = C \Delta V/\Delta t$, where C is the capacitance of the charge-collecting conductor 34-544.

We now return to a description of the system as a whole. Referring now to FIG. 2, block 2L symbolizes a nuclear reactor or other type of device, as, for example, a Production Process. Block 2k indicates a control device for 2L. In the case of the nuclear reactor, 2L symbolizes not only control rods but also an electro-mechanical assemblage capable of maintaining any desired reactivity in the reactor core. An on-line computer at 2i not only permits the control of the reactor to any desired level of power output but also makes possible a complete analysis of core power distribution. In addition, it is capable of generating physics data and plant performance data for measurement, control and production of nuclear power.

For reactor application a suitable type of ion chamber tube may be employed at 2a (e.g., the Westinghouse Compensated Ionization Chamber WL-6377). It may be mounted in or near the core lattice for continuous monitoring of neutron flux levels. Several such ion chamber type tubes may be employed in conjunction with a given reactor core. In FIG. 2 it is seen that reactor 2L connects back to ion chamber 2a. This link symbolizes the neutron flux level within the reactor core, at any instant, producing current within the ion chamber. Control unit 2k is effective for removal or injection of control rods in the reactor lattice in response to the ion current levels maintained in the chamber by the neutron flux levels in the core.

The on-line computer 2i is usefully employed to receive and store in memory flux level information in the form of digital time interval readings. It is capable of output signals to control unit 2j which in turn controls both the electrometer bias potentials at 2e as well as the reactor-power levels by means of control 2k.

Referring to FIG. 1, a pulse source li is capable of outputting several frequencies. More specifically, a high and low frequency, at a minimum, are desirable for the general run of applications. The utility of the low frequency is seen in a system that operates on an intermittent basis. For example, if a system is to be used for measuring the half life of longer half lived isotopes, operation on an intermittent basis is desirable. During the intervals when measurements are not taken it is desirable to keep an accurate measure of this "off" time. For the off time measurement, then, the pulse source li is operated at the lower frequency. The gate shown at lj, controlled by logic 1h, thereupon permits the primary counter to collect pulses at a slower rate. Thus the lower frequency prevents the accumulation of a number of counts beyond the primary counter capability. However, when it is desired to measure radiation where the time intervals are short, the high frequency pulses from source li are used. Fast counting with higher frequencies permits one to obtain in a short counting interval as many significant figures as possible.

It is understood that the control logic indicated at 1h and 1L in FIG. 1 are not entirely separate units. In reality they represent the logic of the entire system but are diagrammed as separate blocks so that the flow of control may be more easily represented.

The primary counter reading may be transferred out into a parallel, buffer memory, before it is read out into more permanent type of record; or it may be read out serially. However, whatever method of read-out is employed a minimum (but constant) interval of time is lost. This dead time, at most, is of the order of one-half second. In one instrument, a 0.75 sec. counter has been employed to inhibit the primary counter during a 0.75 sec. interval subsequent to the readout of the primary counter. Apart from this, the Primary Counter counts continuously. The dead time correction for the Primary Counter is updated at a later time in the system sequence.

In FIG. 8 is shown a schematic circuit diagram for an AC potential supply for the binants of the electrometer. The Shonka electrometer under manual operation does not require precise AC zero adjustment nor precision phase adjustment, since a reversal of the motion of the pattern in the eyepiece indicates to the operator the exact instant for the termination of a time interval reading. Nonetheless, under automatic, continuous operation it is required that the same sharpness of focus be maintained throughout a series of measurements. This sharpness of focus is controlled both by a phase adjustment 906 as well as by the ground adjustment 904 of FIG. 8.

Indicated at 901 in FIG. 8 is a source of AC power which may be conveniently 60 Hz 125 volts. A variac is shown at 902. It may be employed as the AC power level control, supplying potential to the primary of the step-up transformer 903. For the Shonka electrometer the output of this transformer need not exceed 500 or 600 volts. The AC ground adjustment at 904 together with the phase control at 906 are together important for maintaining the same sharpness of focus, as we have said, of the electrometer needle when it is at rest in the AC field.

At 905, isolation capacitors are shown. Capacitor 908 (about 30 mmf) slightly loads the circuit. The electrometer is shown at 33 with connections for the circuit to its binants 20 and 21. The quartz fiber, the vibrating member of the electrometer is shown at 34.

Various methods may be employed to stabilize the AC null adjustment of the electrometer. For example, temperature control of the critical circuit elements of FIG. 8 will hold the electrometer in AC null adjustment.

Another method is shown in FIG. 9. Suppose that DC bias is removed from 34-544, the electrometer's collecting electrode of FIG. 7, so that the needle 34, is at AC null, except for the final adjustment of ground at 904 and phase at 906 (FIGS. 8 and 9). At 931A FIG. 9, a photomultiplier tube is shown connected through resistors 940 and 941 to ground. A differentiator circuit at 950 is employed to sense the rate of change of current in resistor 940. Assume that the output of 950 is positive when $di/dt$ of resistor 940 is increasing; is negative when $di/dt$ is decreasing and is zero when $di/dt$ is zero. At 960 is indicated a polarity sensing circuit, a motor drive, and circuit logic for alternately driving, first motor 903 and grounding potentiometer 904, and then motor 905 together with phase potentiometer 906. (Potentiometers 904 and 906 are also shown in FIG. 8.)

Basically the circuits of 960 do the following: they set in motion alternately motor 903 and 905; if $di/dt$ is positive they reverse the direction of drive of the motor; if $di/dt$ is negative they continue to drive the motor; if $di/dt$ is zero they stop the motor. Logic at 906 is also programmed for two or more successive, double adjustments of potentiometers 904 and 906, first driving one, then the other; the adjustments occur automatically. Adjustments may be programmed to occur between a batch of readings of the instrument or even to interrupt a series of readings. Such an arrangement will maintain the instrument continuously in AC null adjustment.

While the novelties of the single-slit-real-image-phototransducer system are most useful for obtaining digital readout of data from the vibrating quartz-fiber electrometer, it may also be used for obtaining analog readings. A block diagram is shown in FIG. 10.

For analog operation, needle 34 (FIG. 7) is maintained at AC null during the time of ion collection from chamber 43. Normally, as ions are collected, the charge placed on the needle causes it to vibrate in the AC field. This permits more light flux to strike the phototransducer and more current to pass through resistor 940, FIG. 9. By monitoring this current increase by the employing of a constant reference voltage parallel to 940, and by sampling the potential difference between the reference voltage and the voltage across 940; and further, by employing an amplifier at the lower ends of resistor 940 and the reference voltage, the voltage difference may be amplified and used to drive servo motor, 91 of FIG. 8, thus offsetting the increase of charge on the needle so that the needle may be maintained at rest with its image overlapping the slit.

This technique of generating drive for a servo motor so as to maintain a bridge in balance is well known to the art and is symbolized at 11g of FIG. 10.

The servo balance motor is shown at 91 in FIG. 8. It drives potentiometer 92 across which is maintained a constant DC potential, 93. Resistors 90 are equal in value and supply a high impedance path between points 909. With potential source 93 connected with the correct polarity orientation, this circuit will continuously maintain the electrometer needle at AC null. The dotted circuit between points 909 of FIG. 8 is symbolized in FIG. 10 at 11f. It may be noted that there are other possible circuit arrangements that could be used to obtain continuous AC null for analog recording.

A strip chart recorder is shown, at 11h, of FIG. 10. It may be driven by the same motor, 91, FIG. 8, which is used to maintain the electrometer needle at AC null. By the employ of two limit switches at each side of the strip chart, one may periodically (when the recording needle reaches its limit) return the strip chart needle as well as potentiometer 92 of FIG. 8 to their initial positions. Simultaneously with this rebiasing operation, contact point 513 of FIG. 7, may be brought into contact with ion collecting electrode 34-544, permitting the ion charge collected from the chamber to leak to ground. After this double resetting operation the left limit switch removes contactor 513 from the collecting electrode and the strip chart continues analog recording.

FIG. 11 shows a plan view of an optical, analog to digital converter that may be used, for example, as a rate of production indicator. The end of a rotating shaft is shown at 20. The shaft carries an arm 34 rotating in the plane of the circle, 70 in direction, 10. An optical slit, 40, in a mask, 39, which is either close enough to arm, 34 that optical flux incident on the slit and a phototransducer (not shown) may be interrupted, or a real image of the arm 34 produced at optical slit, 40 may be employed to produce phototransducer signals.

As a rate of production indicator the rotation of the shaft is measured by counting the shaft revolutions and by driving the shaft at a rate proportional to the speed of product production.

FIG. 12 shows another form of a rate of production indicator that employs more than one optical slit. The rotating shaft end is shown at 20. The shaft carries arm, 34 which is attached to a spring return mechanism shown at 8. In this device the production rate is proportional to the angle of deflection of arm 34. The circle at 70 shows the plane of motion of the deflecting arm, 34. Mask 39 contains optical slits 40, 41 and 42. The plane of the slits may be close enough to arm 34 to permit the arm itself to interrupt light flux at the slits or, if at a distance, the real image of arm 34 may be employed to obtain photoelectric signals. Alternately, mask 39 may be made adjustable so that with only one slit a given deflection may be monitored and a given production rate may be maintained.

FIG. 13 shows a plan view and a side view of a radiometer like structure. Shaft 101 carries two sets of vanes upon which radiant flux at 12 and 13 impenges as in a radiometer. Vane pairs 10 and 11 as well as pairs 20 and 21 are coated on one side so that the radiant flux at 12 and/or 13 can drive shaft 100 in rotation. The coating may be opposite on the pairs (not shown in FIG. 13) so that the shaft rotation effected by the pairs, is in opposition. For light pressure measurements this assembly of vanes should be maintained in a vacuum. The shaft also carries an arm, 34 which is able to modulate light flux shown at 14, illuminating slit 40. Collar, 100 mounts arm 34 and permits its adjustment.

Suppose radiant flux 12 is a constant, standard known source of flux, capable of producing a given rotation of shaft, 100. An unknown flux at 13 can be measured if either the real image of the arm or the arm itself interrupts light flux 14 incident upon optical slit, 40. (A phototransducer is not shown in FIG. 13.) It is understood that a counter system be employed to count the flux interruptions occurring at the slit and thus to obtain time interval measurements and rates of rotation. From these the flux measurements themselves are obtained.

FIG. 14 shows application of this method of measurement to a gravitational field. A rigid bar at 100 is supported by a fulcrum at 101, a support at 102 and a base at 103 in a gravitational field. A known force at 10 acts on the rigid bar and tends to produce rotation but is offset by the force produced by a collector system at 12. A flow of fluid (a liquid or gas) is merely symbolized by the dotted flow line at 16, directed to the collector at 12.

Attached to bar 100 is a needle 34 connected by rigid arm 30. Lens 53 focuses light from source 20 on slit 40 held by mask 39. The optics are so adjusted that the real image 35 of needle 34 will appear in overlapping relationship to slit 40 when the torques produced by the two forces are in balance. Damping, not shown, may be applied to the system. The optical system between light source 20 and phototransducer 60 is shown in separated (exploded) relationship.

This invention is also meant to encompass an optical slit-photomultiplier-gravitational field system for automatic flow measurement in which the needle itself is large enough to interrupt light flux at the optical slit without the intermediary of its own image. It should be clear from FIG. 14 how signals derived from phototransducer 60 may be used to make continuous force measurements and flow measurements. For this purpose a release valve at 17, electrically operated through connections 4 and 5 and controlled by the phototransducer signal at 60 permits evacuation of the collected fluid at 12. This rotates bar 100 and arm 30 thus removing the optical signal from phototransducer 60 which, in turn, closes valve 17, permitting the collection of a new sample of fluid at 12. Measurement and recording of the time interval of each sample collected permits a continuous monitoring of the flow rate at 16.

Having presented my invention, what I claim is:

1. In combination, a measuring system, comprising:
    a. an electrometer having a movable element or needle, mounted within an electric, alternating current field of force,
    b. said field of force capable of producing a vibratory motion of said movable element in response to a first force and to a second force,
    c. said first force being due to an electric charge from a direct current source of potential,
    d. said second force being due to electric charge flowing to the collecting electrode of an ionization chamber,
    e. said collecting electrode being connected to the said movable element of said electrometer,
    f. means for applying said first force to said movable element and
    g. means for applying said second force to said movable element,
    h. said first force due to known quantities, said second force due to quantities under measurement,
    i. said first and second force of opposite kinds, capable of annulling the effect of one another when equal in magnitude,
    j. monitoring apparatus for determining the condition of movement of said movable element and the time when the said first and the said second force are equal to one another,
    k. said monitoring apparatus comprising:
    l. an optical system consisting of a source of illumination, a focusing device, a mask containing an aperture of predetermined outline,
    m. said illuminating source, optical system and mask arranged to cast a real image of said needle on said mask in overlapping relationship to said aperture,
    n. a transducer positioned adjacent said aperture to generate an undulating electric signal responsive to the presence of the real image of said aperture;
    o. a recording means for recording the presence of said real image of said needle at said aperture, responsive to said undulating electric signal,
    p. means responsive to said undulating signal for recording the effect of said second force.

2. In a measuring system according to claim 1, said mask containing apertures:
    a. a first aperture,
    b. a second aperture not parallel to first said aperture.

3. In a measuring system according to claim 1, said mask containing:
    a. an aperture adjustable.

4. In a measuring system according to claim 3,
    a. said mask capable of being rotated.

5. In a measuring system according to claim 3,
    a. means responsive to said undulating signal to apply a new first force to said movable element thus to permit the application of said second force to said movable element and thus continuously to take measurements with the system.

6. In a measuring system as described in claim 3, said recording system comprised of:
    a. a counting means,
    b. pulse sources, of known frequency, to be counted,
    c. time recording equipment to record the counted pulses responsive to said undulating signal.

7. In a measuring system as described in claim 3,
    a. a memory means,
    b. means to calculate the effect of said second force,
    c. control means, responsive to said effect of said second force to control said first force means.

8. A method for measuring radiation, said method comprising:
    a. production of ions by radiation,
    b. production of charge from a known potential source,
    c. establishing a field of force where forces can react,
    d. placing an object capable of motion in said field of force,
    e. applying a first, known force to said object, so that the force acts and is acted upon in said field of force,
    f. creating a flow to said object of a second, unknown force so that the said object again acts upon the said field of force and is acted upon by said field of force,
    g. said first force being opposite to said second force and thus being capable of annulling one another when they cause a balance,
    h. applying a monitoring device to determine the time of balance of said two forces,
    i. said monitoring device being the real image of a needle fixed to and in motion with said object, and, at balance, in overlapping relationship to an optical slit operture,
    j. placing a transducer adjacent to said mask so as to produce a signal at the time of balance of said two forces,
    k. said real image transducer signal connected to cause to record the time of balance of said two forces,
    l. said transducer signal to wipe out old force and to initiate a new first force for measurement of a new second unknown force,
    m. said field of force being an electric, alternating current produced field,
    n. said object being the needle of an electrometer,
    o. said first force being said charge from said known potential source,
    p. said second force being the charge from said ions produced by radiation.

* * * * *